Sept. 1, 1970      C. G. DYE      3,526,078
PACKAGE COMPACTING DEVICE
Filed April 28, 1969
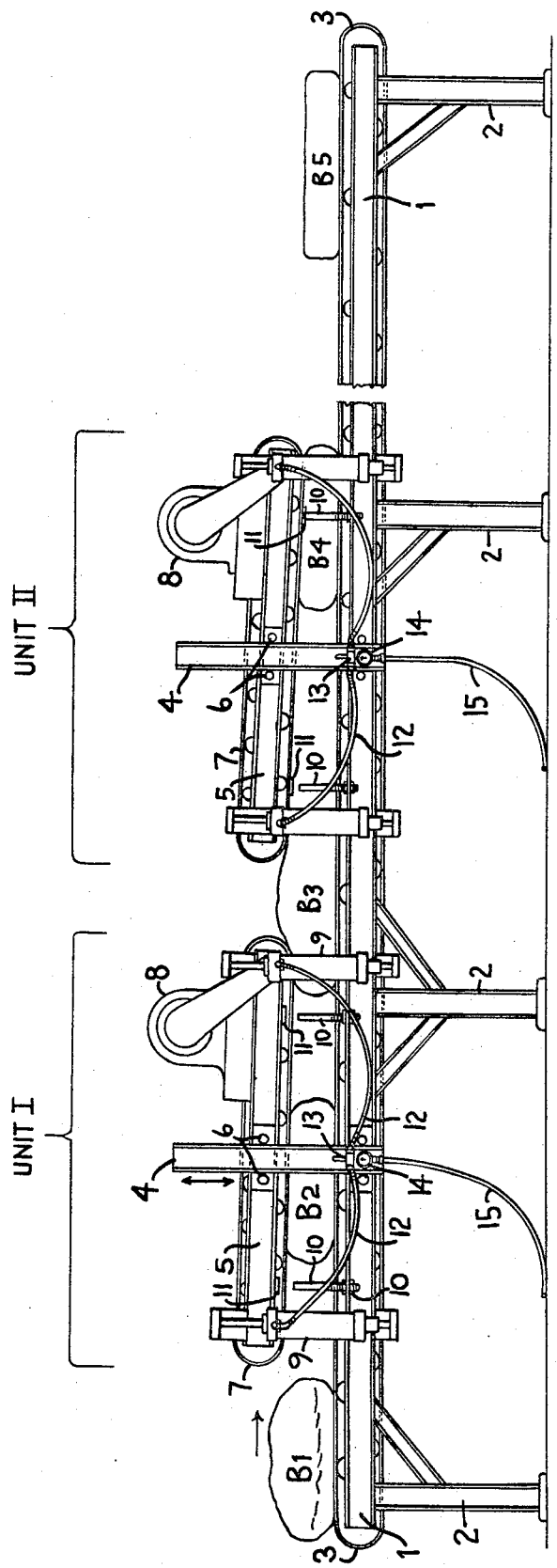
INVENTOR
CLOYDE G. DYE
ATTORNEYS

United States Patent Office 3,526,078
Patented Sept. 1, 1970

3,526,078
PACKAGE COMPACTING DEVICE
Cloyde G. Dye, Barberton, Ohio, assignor to PPG Industries, Inc., Pittsburgh, Pa., a corporation of Pennsylvania
Continuation-in-part of application Ser. No. 582,074, Sept. 26, 1966. This application Apr. 28, 1969, Ser. No. 825,108
Int. Cl. B65b 1/24
U.S. Cl. 53—124      8 Claims

ABSTRACT OF THE DISCLOSURE

Disclosed is a device for producing firm, rigid packages of compacted, finely-divided, particulate material from enclosed, highly-aerated packages of the material. The device includes a base frame which supports conveying means such as an endless belt. The device further includes compacting means disposed along the conveying means for applying a squeezing force to the package, thereby reducing the volume and driving air from the package.

CROSS-REFERENCE TO RELATED APPLICATIONS

This application is a continuation-in-part of application Ser. No. 582,074, filed Sept. 26, 1966.

BACKGROUND OF THE INVENTION

This invention relates to providing firm packages of finely-divided materials. It more particularly relates to treating a highly-aerated package of finely-divided material such as siliceous pigment or carbon black to produce a firm package of said material in densified form. The invention has particular application to materials with average ultimate particle sizes below about 1 micron.

Substantial quantities of finely-divided materials are consumed industrially each year. The paint, paper, and rubber industries, for example, consume many thousands of tons of these materials annually. Because of the powdery nature of many of these materials and the possibility of substantial dust losses in the processes in which they are used, bulk handling of these finely-divided materials is often impractical.

Some highly-aerated materials can be densified or agglomerated to produce products which are both suitable for bulk handling and possess acceptable process characteristics. Other materials such as siliceous pigments and some carbon blacks are not conveniently densified or agglomerated to an acceptable commercial product. Thus, these materials must be shipped and handled in relatively small packages. One widely used package is a paper bag filled with a standard weight of the finely-divided material. Often, the packages are highly aerated and are consequently difficult to handle. In addition, the highly-aerated packages tend to require a considerable amount of space per ton of materials shipped, resulting in substantial freight charges and handling costs. The instant invention provides for packaging such highly-aerated materials in a firm rigid package.

In accordance with the practice of this invention, packaged loose, powdery material is subjected to a plurality of squeezing actions. In this fashion the packaged material is densified to increase its bulk density and decrease its bulk volume. The shape of the package is altered such that the wrapper snugly encloses the densified material. Thus, a firm, easily handled package results. At the same time, undue compaction of the packaged material is avoided so that the desirable processing properties, e.g., dispersability of the material, are maintained.

Excessive compaction of a finely-divided material such as a siliceous pigment may seriously impair its dispersability. An excessively-compacted siliceous pigment often cannot be readily slurried in water, for example. It is further often difficult to mix such a material into a rubber master batch. The instant invention avoids these difficulties.

Commonly assigned copending application Ser. No. 344,964, filed Feb. 14, 1964, now issued as U.S. Pat. No. 3,389,529, the disclosure of which is hereby incorporated by reference, discloses a method whereby highly-aerated packages of siliceous pigments are shaped into a package of reduced bulk volume. According to that invention, highly-aerated packages are pressed in a cavity mold. The packages are thereby decreased in volume while the wrappers of the packages are increased in surface area. The resulting packages are firm and easily handled. In addition, the pigments contained in the packages are significantly increased in bulk density wihle retaining suitable commercial properties such as high dispersability. Although a highly desirable package is produced in accordance with the teachings of the aforesaid Ser. No. 344,964, the procedure and equipment described therein have certain limitations. Thus, for example, according to the aforesaid co-pending application, equipment must be sized to accommodate specific sizes of wrappers. Separate molds are typically required for different materials. In addition, automation of the process disclosed therein is difficult. Accordingly, a considerable amount of time and manpower is required in the practice of the afore-described process.

According to the instant invention, there is provided a process for shaping highly aerated packages of finely-divided aerated materials such as the siliceous pigments of the aforedescribed co-pending application to produce acceptable firm packages at a very rapid rate. A single piece of equipment can readily be adjusted to accommodate products of widely varying characteristics. The same equipment can shape and densify packages of widely varying dimensions.

In the practice of the present invention, a package comprising a wrapper filled with aerated material is subjected to alternating squeezing (or pressing) actions with intermediate releases of said squeezing action. Each squeezing action is applied in such a fashion that it permits the package to increase in dimension parallel to at least one axis thereby stretching the wrapper. As a result of the squeezing action, the volume of the package is reduced thereby compressing free air in the package and forcing it out of the package through the wrapper. After being subjected to a plurality of such squeezings, the package assumes a firm, rigid character. The resulting package comprises a wrapper firmly containing densified particulate material of acceptable dispersability.

As the volume of the package decreases, free air in the package is compressed and exerts a force against the wrapper and the materials contained therein. The rate at which the squeezing action is applied is kept sufficiently low to allow the compressed air to escape through the wrapper before the pressure build-up in the package exceeds the burst strength of the wrapper. In addition, the maximum pressure applied by each squeezing action is kept below the level which would result in excessive compaction of the pigments.

It is essential in the practice of this invention that a plurality of squeezing actions be applied to the package with intermittent releases of the squeezing action. These intermittent releases apparently permit free air driven into the finely-divided material during the squeezing action to migrate from the material to the space between the material and the package wrapper. During the first squeezing action, a considerable amount of free air is compressed into the finely-divided packaged material. Upon release of the first squeezing action, a loose sloppy package remains because of the free air which migrates into the space between the wrapper and the material. A subsequent squeezing action drives a substantial portion of this air through the wrapper. By repeating this cycle of squeezing and releasing the package, a firm package with the wrapper relatively snugly surrounding densified material is achieved.

The preferred method of applying the squeezing actions to the package is to convey the package between continuous belts. The spacing between the belts, i.e., the nip or separation of the belts, is adjusted to force the dimension of the package parallel to one axis to decrease to a desired degree. The package is free to expand in dimension parallel to the remaining two axes. Preferably the spacing between the belts is adjustable by means adapted to maintain a predetermined maximum pressure against the package. Although this pressure applying means could be mechanical, e.g., spring means, the preferred means are hydraulically or pneumatically separated. Pneumatic cylinders are highly preferred because of the relatively more uniformed pressure control across the surface of the package provided by said means.

A single pair of belts can be employed, for example, by alternately decreasing and increasing the spacing between the belts as packages are conveyed between them. The packages may be positioned on top of one such belt while the second belt is positioned over the packages. Either or both of the belts may be powered to transport the packages. During the press or squeeze portion of the cycle, the separation of the belts is decreased to less than the previous thickness of the package. The belts thereby apply pressure to the packages. The decrease in separation is powered by a means, e.g., pneumatic cylinders, designed to apply no more than a predetermined maximum pressure. Ideally, the belts are separated sufficiently during the release portion of the cycle to completely separate the upper belt from contact with the package.

According to preferred embodiments of the invention, each press or squeeze is applied between a different pair of belts. In one highly preferred embodiment, the packages are placed on top of a continuous powered conveyor belt. As the packages are conveyed on this belt, they pass beneath a plurality of shorter continuous belts. Each of these belts may be adjusted to apply a pre-determined pressure to the packages and to conform the package to desired dimensions. The speed of the belts is preferably variable. The duration of the press portion of the cycle can then be reduced or increased as desired by adjusting the speed of the belt. In general, a greater degree of compaction of the packaged material is achieved at lower speeds.

The extent to which it is desirable to densify a pigment varies among individual pigments depending on their individual properties. In general, the siliceous pigments contemplated by this invention, i.e., siliceous pigments containing at least 50, typically above 60, often above 80 percent by weight $SiO_2$, on an anhydrous basis, with bulk density below 20 pounds per cubic foot, usually between about 5 to about 18 pounds per cubic foot and average ultimate particle size below about 1.0 micron, usually below about 0.4 micron, typically between about 0.01 and about 0.1 micron may be compacted to a significant extent without losing desirable, e.g., dispersion, properties. Thus, the pigments in the packages produced in accordance with this invention may have more than double the bulk density of the uncompacted pigment. Typically the bulk density is increased by from about 5 to about 70, usually about 10 to about 45 percent, basis the uncompacted pigment.

An important aspect of this invention is the production of firm, easily-handled packages. A good package is often obtainable when the bulk density is increased significantly but not sufficiently to decrease the bulk volume of the pigment substantially. What amounts to a significant increase in bulk density with respect to producing a firm package varies among pigments. Usually an increase of about 5 to about 10 percent in bulk density is sufficient to produce a good package.

The number of press-release cycles required to produce a good package also varies considerably depending upon the nature of the material in the package. Ordinarily 3 to 6 squeezes are sufficient. In rare instances a satisfactory package results from 2 squeezes. Packages of materials particularly subject to over-compaction when they are subjected to moderate pressures, e.g., pressures on the order of 100 p.s.i. may require many more, e.g., 10 to 20 or more squeezes, at lower pressures.

Pressures well below the critical pressure of the packaged material, e.g., the pressure at which the desirable properties enumerated hereinbefore are seriously impaired, are usually effective. For example, it is rarely necessary to apply a pressure in excess of 50 p.s.i. to the surface of a package during any given press-release cycle. Pressures between about 2 and about 25 p.s.i. are usually convenient and give consistently good results. Higher pressures can often be employed without impairing the quality of the packaged material but are not ordinarily convenient with presently available equipment. In the specific case of silica pigments, pressures below about 25 e.g., between about 5 and about 20 p.s.i. are generally satisfactory. Sometimes squeezing pressures of as low as 1 p.s.i. or less are applied to packaged siliceous pigments in a given cycle.

The preferred wrapper for the package contemplated herein is a paper bag. The initial volume of the bag must be sufficient to accommodate the uncompacted loose pigment material. Thus, the initial volume of the bag is considerably typically at least 5, usually about 10 to 30, rarely more than 40 percent, larger than the volume of the finished package.

A loosely filled bag of compacted material is difficult to handle and allows the compacted pigment to crumble upon handling. Thus, this invention provides a finished package wherein the compacted pigment snugly fills the entire volume of the bag. It is recognized, however, that a minor percentage of the internal volume at the corners of even a well pressed bag may not be completely filled.

The material of the bag is extensible and somewhat elastic. The surface area of the unpressed bag is preferably at least about 1, typically about 2 to about 10, rarely more than 20 percent, less than the surface area of the finished package. In this fashion, the wrapper is flexed or stretched snugly around the compacted pigment in the finished package. Thus, the compacted material is elastically confined by the bag. That is, a compressive force is exerted by the bag on substantially the entire surface of the compacted mass of pigment in the bag. As a result, the package is rigid and firm. Such a package is easily handled. The packages can be roughly handled with no substantial crumbling of the contents.

The preferred material of construction for the bags is extensible kraft paper. Extensible kraft paper has greater elastic properties than natural kraft paper. Bags manufactured from extensible papers such as the one described in U.S. Pat. 2,624,245, for example, has given consistently good results. Bags constructed of natural kraft paper have been generally unsatisfactory. Of course, this invention is not limited to any particular bag or wrapping material. It is sufficient that the material surrounding the compacted pigment be sufficiently stretchable to avoid bursting when the bag is conformed to the dimensions of the final package. Strong crepe papers produce excellent bags for this invention but are usually prohibitively expensive. The bag material must also be sufficiently porous to allow air to escape through the bag walls as the volume of the sealed bag is decreased. In general, extensible kraft papers are less likely to burst if they are conditioned, prior to pressing, to contain a high, e.g., about 5 to about 10 percent water (based on the weight of the bag).

The accompanying drawing illustrates apparatus useful in the practice of this invention. Like figures represent like elements of the apparatus.

The apparatus shown in the drawing comprises a plurality of driven belts held by a stationary structural frame 1. This frame 1 is positioned at a convenient height from the floor by supports 2. A continuous conveyor belt 3 is carried by the stationary frame 1. Belt 3 is driven by a drive means, preferably a variable speed motor (not shown), and is of sufficient length to transport a large number, e.g., about 10 to 100 or more packages. A plurality of vertical support frames 4 are attached to frame 1 at intervals along the length of belt 3. A horizontal riding structural frame 5 is held in position over conveyor belt 1 by each of the vertical frames 4. Rollers 6 are attached to frames 5 and bear on frames 4. Thus, frames 5 are free to ride up or down frame 4, being guided by means of rollers 6. Each frame 5 carries a conveyor belt 7 and a drive motor 8. Pneumatic cylinders 9 are attached at each corner of riding frames 5. Each cylinder 9 also connects to the stationary frame 1.

In practice, pneumatic pressure is applied through the cylinders 9 independently to each corner of each riding frame 5. There is sufficient freedom of movement of riding frames 5 with respect to vertical frames 4 that the height of each corner of the riding frames 5 may differ. Even so, the cylinders 9 and vertical frames 4 maintain the position of the riding frames 5 directly above the stationary frame 1. The minimum spacing between belts 7 and belt 3 is provided by adjustable stop bars 10 which are attached to frame 1. These bars may be independently raised or lowered to increase or decrease, respectively, the length of the bar extending vertically above belt 3. A strike plate 11 is attached to riding frames 5 above each bar 10. Air is supplied to the pneumatic cylinders 9 through hoses 12. Air pressure is controlled by valve 13 and is read on gauge 14. The air supply (not shown) is connected to the valve 13 by a supply hose 15.

The apparatus employed in this invention usually includes several, e.g., 3 to 20 or more, units comprising a riding frame 5, vertical frame 4 and ancillary apparatus, e.g., pressure applying means (cylinders 9) drive means (motor 8) and stop means (10 and 11). Two such units, designated Unit I and Unit II, respectively, are shown on the drawing. Several bags, $B_1$ through $B_5$ are shown representing various stages of completion of the method of this invention.

In the practice of this invention a highly aerated bag $B_1$ of particulate material is placed on conveyor belt 3. Belt 3 is driven to carry bags placed thereon consecutively under belts 7 of Units I, II and as many other similar units as may be provided. A predetermined air pressure is applied to cylinder 9 to drive belts 7 toward belt 3. When no bag is between belts 3 and 7, strike plates 11 rest on stop bars 10. When a bag is delivered between belts 3 and 7, it lifts the unit carrying the belt 7 thereby raising strike plate 11 from stop bars 10. In this fashion, the force delivered by cylinders 9 is transferred to the bag. Bag $B_2$ is shown being squeezed between belt 3 and belt 7 of Unit I. Bag $B_3$ is shown emerging from Unit I and entering Unit II. All of the strike plates 11 of Unit I are separated from the stop bars 10. Thus, both bag $B_2$ and the portion of bag $B_3$ still under Unit I are being squeezed by the total force delivered by cylinders 9 of Unit I. The Units I and II can be spaced to allow complete emergence of bag $B_3$ from Unit I before it enters Unit II. This spacing is not ordinarily required, however, to provide an adequate release of squeezing in accordance with this invention. Bag $B_4$ is shown being squeezed between belt 3 and belt 7 of Unit II. This bag $B_4$ was previously squeezed under Unit I, the squeeze being released during its travel between Units I and II. Bag $B_4$ is illustrated as having been pressed to the maximum extent possible under Unit II. The rear stop bar 10 of Unit II is in contact with strike plate 11 preventing further reduction of the spacing between belts 3 and 7. Bag $B_5$ represents a fully pressed bag after it has emerged from the last of the squeezing units provided along the length of conveyor belt 3.

The air pressure is independently adjusted for each unit. The squeeze pressure applied to a package may be progressively increased in successive units. For example, a pressure of about 5 p.s.i. may be selected for a first squeeze. Subsequent squeezes may be increased in increments of about 2 p.s.i. to a final squeeze of about 11 p.s.i. Sometimes it is preferred to subject a package to an initial squeeze at fairly high pressures, e.g., about 10 to about 25 p.s.i. The package is then subjected to one or more squeezes at lower pressures, e.g., about 2 to about 10 p.s.i. followed by one or more squeezes at higher pressures, e.g., about 10 to about 25 p.s.i. The optimum cycle for a specific material is readily determined by one skilled in the art with knowledge of the properties of the material. Often several alternate cycles are useful.

According to a preferred embodiment of this invention, the initial minimum separation (nip) between the belts of the riding frame and the stationary frame is adjusted to be greater than the final separation. In this fashion, the entry of a package between the belts is facilitated. It is also helpful to adjust the initial nip of a unit somewhat greater than the final nip of a previous unit.

The invention will be more completely understood with reference to the following Examples:

EXAMPLE I

Several bags were charged with 50 pounds each of a siliceous pigment with the following approximate chemical composition and properties:

|  | Percent by wt. |
| --- | --- |
| $SiO_2$ | 80 |
| NaCl | 1 |
| CaO | 6 |
| $Al_2O_3$ | 0.5 |
| $Fe_2O_3$ | 0.1 |
| Free water | 5.0 |
| Bound water | 7.4 |
| Surface area (BET) (square meters per gram) | 40 |
| Ultimate particle size (microns) | 0.08 |

The bags were constructed of three plys of 50 pound extensible kraft paper. The said bags were sealed and placed on a continuous belt such as that illustrated in the drawing. Pressure was applied to the bags by means of four pressure applying units such as those labelled Units I and II in the drawing. The length of each of the pressure applying units was about 5 feet. All belt speeds were about 50 feet per minute. Four pneumatic cylinders powered each unit. Each cylinder had a 12:1 ratio. Thus, each cylinder could provide 2400 pounds force from an air input of 200 p.s.i. The initial and final nips between the lower conveyor belt and belts carried by the units were adjusted for each unit. Table 1 reports details of the operation and data obtained.

EXAMPLE II

The general procedure of Example I was repeated using the same pigment as in Example I but employing a different cycle and a different sized bag. Pressure was applied by five units. Operating conditions and results are reported in Table 1.

EXAMPLE III

The general procedure of Example II was repeated. The cycle was altered as reported in Table 1. A pigment of the following approximate chemical compositions and properties was employed:

| | Percent by wt. |
|---|---|
| $SiO_2$ | 88.0 |
| NaCl | 1.0 |
| CaO | 0.5 |
| $Al_2O_3$ | 1.0 |
| $Fe_2O_3$ | 1.5 |
| Free water | 6.0 |
| Bound water | 2.0 |
| Surface area (BET) (square meters per gram) | 140–160 |
| Average ultimate particle size (microns) | 0.022 |

Operating conditions and results are reported in Table 1.

TABLE 1.—PRESS-RELEASE CYCLES FOR PRODUCING FIRM PACKAGES OF SILICEOUS PIGMENTS

| Example | Average bag size (inches) | | Average bulk density | | Unit I | | | Unit II | | |
|---|---|---|---|---|---|---|---|---|---|---|
| | Initial | Final | Initial | Final | Initial Nip | Final Nip | P.s.i.* | Initial Nip | Final Nip | P.s.i.* |
| I | 20 x 35 x 10½ (gusset) | 20 x 35½ x 6½ | 11.8 | 18.7 | 8¾ | 6⅝ | 25 | 6½ | 5½ | 75 |
| II | 18½ x 39 x 9 (gusset) | 19 x 38½ x 6 | 13.3 | 18.2 | 8¾ | 6⅝ | 150 | 7⅝ | 5 | 150 |
| III | 19½ x 35 x 8½ (gusset) | 20 x 34½ x 6½ | 14.8 | 17.7 | 8¾ | 6½ | 150 | 7⅝ | 5 | 150 |

| Example | Unit III | | | Unit IV | | | Unit V | | |
|---|---|---|---|---|---|---|---|---|---|
| | Initial Nip | Final Nip | P.s.i.* | Initial Nip | Final Nip | P.s.i.* | Initial Nip | Final Nip | P.s.i.* |
| I | 7 | 5½ | 150 | 7 | 5½ | 150 | | | |
| II | 6½ | 5½ | 150 | 6½ | 5½ | 150 | 5½ | 5 | 150 |
| III | 6½ | 5 | 75 | 6½ | 5½ | 125 | 5½ | 5 | 150 |

*Input air pressure to the pneumatic cylinders. Each cylinder had a 12:1 input:output ratio. Thus, with a single bag measuring about 20 x 40 inches beneath a pressure applying unit, an input air pressure of 25 p.s.i. corresponds to about 1½ p.s.i. pressure applied to the package surface. The weight of each unit applies a small amount, i.e., between about ¼–½ p.s.i., additional pressure to the bag surface.

Although the invention has been described with reference to certain specific details and preferred embodiments, it is not intended to thereby limit the scope of the invention except insofar as these details are included in the accompanying claims.

What is claimed is:

1. A device for producing firm, rigid packages of compacted, finely-divided particulate material from enclosed, highly-aerated packages of said material, said device comprising:
   first endless belt compacting means for applying a first squeezing force to each one of said packages thereby reducing the volume of said package and causing a portion of said air to pass from said package;
   second endless belt compacting means for applying a second squeezing force to each one of said packages thereby further reducing the volume of said package and causing a further portion of said air to pass from said package;
   endless belt conveying means for conveying said packages to and from said first and second compacting means; and
   force-exerting means in conjunction with each of said endless belt compacting means for urging each of said endless belt compacting means toward said endless belt conveying means with a particular degree of force.

2. The device of claim 1 wherein said endless belt conveying means comprises a base frame and an endless conveyor belt supported by the base frame and wherein said first and second endless belt compacting means each comprises a frame movable toward and away from the endless conveyor belt, an endless compacting belt supported in said movable frame and a plurality of fluid-driven cylinders for urging said compacting belts toward and away from said conveying belts, each of said cylinders acting independently at spaced locations along said movable frame.

3. The device of claim 1 wherein said force exerting means is adjustable whereby the degree of force exerted by the endless compacting belts can be adjusted to and maintained at a desired value, said value being of sufficiently large magnitude to compact the particulate material to form a firm, rigid package and of sufficiently low magnitude to avoid breakage of the packages.

4. The device of claim 3 wherein said force exerting means comprises fluid driven means.

5. The device of claim 4 wherein said fluid driven means comprises first fluid driven means for urging said first endless compacting belt toward said conveyor belt and second fluid driven means for urging said second endless compacting belt toward said conveyor belt and wherein said first and second fluid driven means are individually adjustable.

6. A device for compacting closed packages of highly-aerated, finely-divided particulate material comprising;
   base frame means and a continuous conveyor belt supported by said base frame means;
   first compacting means disposed adjacent the conveyor belt, said first compacting means comprising a frame movable toward and away from said conveyor belt, a continuous compacting belt supported by said movable frame and operating substantially parallel with said conveyor belt, and fluid-driven means urging said movable frame and said continuous compacting belt toward said conveyor belt, whereby said continuous conveyor belt supports and transports the packages of highly-aerated, finely-divided particulate material beneath the compacting belt where compacting force is applied to each package thus reducing the volume of each package and causing a portion of the air to pass from each package; and
   second compacting means disposed adjacent said conveyor belt spaced downstream of said first compacting means, said second compacting means comprising a frame movable toward and away from said conveyor belt, a continuous compacting belt supported by said movable frame and operating substantially parallel with said conveyor belt, and fluid-driven means urging said movable frame and said continuous compacting belt toward said conveyor belt, whereby said continuous conveyor belt supports and transports the packages beneath the compacting belt where compacting force is applied to each package thus further reducing the volume of each package and causing a further portion of air to pass from each package.

7. A device for producing firm, rigid packages of compacted, finely-divided particulate material from packages of highly-aerated, finely-divided particulate material, said device comprising:
   base frame means and conveyor means supported by said base frame means;
   compacting means spaced from said conveyor means, said compacting means comprising a movable frame and a continuous belt supported by said movable frame; and
   controllable force means for urging said compacting belt toward said conveyor means, said controllable force means acting independently on said compacting belt at a plurality of spaced points along said compacting belt.

8. The device as defined in claim 7 wherein said device includes at least two of said compacting means spaced along said conveyor means.

References Cited
UNITED STATES PATENTS
1,153,103 9/1915 Neale _____ 100—151 X
2,907,447 10/1959 Offutt et al.

FOREIGN PATENTS
770,001 3/1957 Great Britain.

TRAVIS S. McGEHEE, Primary Examiner

U.S. Cl. X.R.

100—151